(12) United States Patent (10) Patent No.: US 8,117,299 B2
Narayanaswami et al. (45) Date of Patent: Feb. 14, 2012

(54) METHOD AND APPARATUS FOR SCHEDULING WIRELESS LAN TRAFFIC

(75) Inventors: Chandrasekhar Narayanaswami, Wilton, CT (US); Claus Michael Olsen, Cortlandt Manor, NY (US); Marcel-Catalin Rosu, Ossining, NY (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 968 days.

(21) Appl. No.: 11/037,962

(22) Filed: Jan. 18, 2005

(65) Prior Publication Data

US 2006/0160508 A1 Jul. 20, 2006

(51) Int. Cl.
*G06F 15/173* (2006.01)
*G01R 31/08* (2006.01)
(52) U.S. Cl. ..................................... 709/224; 370/230.1
(58) Field of Classification Search .................. 709/224; 370/230.1
See application file for complete search history.

(56) References Cited

U.S. PATENT DOCUMENTS

| | | | |
|---|---|---|---|
| 5,625,882 A | 4/1997 | Vook et al. | |
| 5,924,116 A * | 7/1999 | Aggarwal et al. | 711/122 |
| 6,212,565 B1 * | 4/2001 | Gupta | 709/229 |
| 6,343,320 B1 * | 1/2002 | Fairchild et al. | 709/224 |
| 6,505,253 B1 * | 1/2003 | Chiu et al. | 709/235 |
| 6,563,517 B1 * | 5/2003 | Bhagwat et al. | 715/735 |
| 7,224,970 B2 | 5/2007 | Smith et al. | |
| 2004/0128310 A1 * | 7/2004 | Zmudzinski et al. | 707/102 |
| 2004/0236851 A1 * | 11/2004 | Kuan et al. | 709/224 |
| 2004/0243335 A1 * | 12/2004 | Gunawardena et al. | 702/116 |
| 2004/0255008 A1 * | 12/2004 | Olsen et al. | 709/220 |
| 2005/0018624 A1 | 1/2005 | Meier et al. | 370/318 |
| 2005/0025081 A1 | 2/2005 | Wakamatsu | |
| 2005/0041684 A1 * | 2/2005 | Reynolds et al. | 370/463 |
| 2006/0160508 A1 | 7/2006 | Narayanaswami et al. | 455/151.2 |
| 2007/0021155 A1 | 1/2007 | Yu et al. | |

FOREIGN PATENT DOCUMENTS

| EP | 1684465 | 1/2005 |
|---|---|---|
| WO | WO 00/22837 | 4/2000 |

OTHER PUBLICATIONS

M. Anand, E. B. Nightingale, and J. Flinn, "Self-Tuning Wireless Network Power Management," In *Proceedings of ACM MOBICOM 2002*.
S. Chandra, "Wireless Network Interface Energy Consumption Implications of Popular Streaming Formats," In *Proceedings of MMCN 2002*.

(Continued)

*Primary Examiner* — John Follansbee
*Assistant Examiner* — Alan Chou
(74) *Attorney, Agent, or Firm* — Ference & Associates LLC

(57) ABSTRACT

To conserve energy, components in mobile devices normally have to transition less frequently between "active" and "sleep" modes, and to sleep for longer intervals. In accordance with at least one presently preferred embodiment of the present invention, there is broadly contemplated herein an approach to reduce energy consumption by using HTTP proxies to shape incoming WLAN traffic. Proxies contemplated herein use techniques specific to the HTTP payload to compensate for any negative impact that shaping may have. Thus, there is described herein the architecture of a "Power-Aware Streaming Proxy" (PASP), built on a PowerAware x-Proxy (PAxP) framework. PASP preferably uses RTSP/RTP semantics to effectively schedule media streams across the WLAN. Herein, PASP is compared with PAWP, which is a PAxP extension for web traffic, and problem areas are identified.

29 Claims, 7 Drawing Sheets

HTTP-level WLAN Traffic Scheduler

OTHER PUBLICATIONS

S. Chandra and A. Vahdat, "Application-Specific Network Management for Energy-Aware Streaming of Popular Multimedia Formats," In *Proceedings of The 2002 USENIX Annual Technical Conference*.

D. Duchamp, "Prefetching Hyperlinks," In *Proceedings of USITS 1999*.

M. Gundlack, S. Doster, D. K. Lowenthal, S. A. Watterson, and S. Chandra, "Dynamic, Power-Aware Scheduling for Mobile Clients Using a Transparent Proxy," In *Proceedings of ICPP 2004*.

R. Krashinsky and H. Balakrishnan, "Minimizing Energy for Wireless Web Access with Bounded Slowdown," In *Proceedings of ACM MOBICOM 2002*.

T. M. Kroeger, D. D. E. Long and J. C. Mogul, "Exploring the Bounds of Web Latency Reduction from Caching and Prefetching," In *Proceedings of USITS 1997*.

S. Mohapatra, R. Cornea, N. Dutt, A. Nicolau, and N. Venkatasubramanian, "Integrated Power Management for Video Streaming to Mobile Handheld Devices," In *Proceedings of ACM Multimedia 2003*.

Part 11: Wireless LAN Medium Access Control (MAC) and Physical Layer (PHY) Specifications, ANSI/IEEE Standard 802.11, 1999.

A. E. Papathanasiou and M. L. Scott, "Energy Efficiency through Burstiness," In *Proceedings of IEEE WMCSA 2003*.

D. Qiao, S. Choi, A. Jain, and K. G. Shin, "MiSer: An Optimal Low-Energy Transmission Strategy for IEEE 802.11 a/h," In *Proceedings of ACM MOBICOM 2003*.

H. Shulzrinne, A. Rao, and R. Lanphier, Real Time Streaming Protcool, RFC 2326, IETF, Apr. 1998.

Y. Kikuchi, T. Nomura, S. Fukunaga, Y. Matsui, H. Kimata, RTP Payload Format for MPEG-4 Audio/Visual Streams, RFC 3016, IETF, Nov. 2000.

H. Shulzrinne, S. Casner, R. Frederick, V. Jacobson, RTP: A Transport Protocol for Real-Time Applications, RFC 3550, IETF, Jul. 2003.

M. C. Rosu, C. M. Olsen, C. Narayanaswami, and L. Luo, "PAWP": A Power-Aware Web Proxy for Wireless LAN Clients, In *Proceedings of IEEE WMCSA 2004*.

T. Simunic, L. Benini, P. Glynn, and G. De Micheli, "Dynamic Power Management for Portable Systems," In *Proceedings of ACM MOBICOM 2000*.

E. Shih, P. Bahl, and M. J. Sinclair, "Wake on Wireless: An Event Driven Energy Saving Strategy for Battery Operated Devices," In *Proceedings of ACM MOBICOM 2002*.

M. Stemm and R. Katz, Measuring & Reducing Energy Consumption of Network Interfaces in Handheld Devices. In *IEICE Trans. on Fundamentals of Electronics, Communications, and Computer Science*, Aug. 1997.

P. Shenoy and P. Radkov, "Proxy-Assisted Power-Friendly Streaming to Mobile Devices," In *Proceedings of the 2003 Multimedia and Networking (MMCN) Conference*.

\* cited by examiner

METHOD AND APPARATUS FOR SCHEDULING WIRELESS LAN TRAFFIC

FIELD OF THE INVENTION

The present invention generally relates to the field of computer software, and more particularly to design and development of network proxies, which are part of the software that supports client applications to access server-based resources.

BACKGROUND OF THE INVENTION

Network proxy servers are networked applications designed to assist client applications interact efficiently with remote servers. Typically, proxy servers are implemented as user-level applications running on dedicated, high-performance networked servers. For better performance, the same functionality can be implemented in a module inside the server's kernel, or in a networked appliance. SOCKS servers represent an early example of network proxies. Web proxy caches (see, e.g., Ari Lutonen, *Web Proxy Servers*, Prentice Hall, 1997) are probably the best known example of network proxies.

Web proxy caches are designed to improve the performance of client browsers and user experience by reducing page download latencies. Client browsers are configured to request content from the web proxy cache. If the proxy has a local copy of the requested document, it returns the document to the client. Otherwise, it forwards the client request to the origin server and forwards the response to the client. The proxy may store a copy of the forwarded document in the local cache (disk). Page download latencies are reduced because the latency of accessing the web proxy server across the enterprise or campus network is much lower than the latency of accessing the origin sever across the Internet. The higher the cache hit rate is, the more page download latencies are reduced. In order to achieve a high cache hit rate, proxy caches have to serve a large client population. Otherwise, the probability of getting a cache hit, i.e., requesting a document that was previously requested by another client, is relatively low. Cache hit rates can reach 50% for large proxy installations serving multiple institutions. In addition to reducing user-perceived latencies, proxies reduce the load on the origin web servers.

Besides improving user experience, web proxy servers provide clients with indirect Internet access. As a result, client machines are protected from a wide range of Internet-originated attacks. In such configurations, using the web proxy is the only way for accessing the Internet: all client machines are placed behind a firewall, which is configured to prevent clients from accessing servers outside the enterprise or campus intranet. The web proxy server is protected from Internet attacks using special host configurations and firewalls. The web proxy server is typically a single-purpose machine, which simplifies the firewall configuration: only HTTP traffic is allowed from/to the web proxy server.

Other networked applications, such as media players or email clients, were changed to take advantage of this proxy-based security architecture and use HTTP as a transport protocol. As a result, a significant amount of the client traffic is, or it can be, directed through the local web proxy. As bandwidth availability and client local cache increase, and more web sites use latency reduction technologies, such as Content Distribution Networks (CDN), the value of using web proxies as caches diminishes. However, the security-related benefits of using web proxies are increasingly obvious since application-level proxies are the only realistic method that enables deep inspection of the network traffic, i.e., HTTP payload for web proxy servers.

Independently, to assist resource-constraint mobile devices, a new category of application-level proxies was developed. Transcoding proxies, which assist PDA/smart phone browsers to display web content on small screens, are probably the most popular example in this category. In addition, web proxy caches provide more benefits to wireless clients than desktop clients because mobile clients have smaller local caches than desktop clients and wireless connections have higher latencies and lower bandwidth than wired LAN connections. More recently, transcoding proxies have been extended to adapt multimedia streams to the mobile client capabilities or to reduce the energy consumed to play the streams. In summary, it is expected that application-level proxies, in particular, HTTP proxies will play an increasingly important role in assisting resource constrained mobile wireless clients.

Reducing the energy consumed by mobile clients is a very important problem as battery capacity has not increased at the same rate as the performance of the device component over the past several years. Although significant technological improvements have reduced the power consumed by these components, most of these improvements reduce the performance of the components as well, or degrade other characteristics of the mobile system, such as responsiveness. At present, capabilities of mobile devices are significantly restricted by the capacity of their batteries and the power-related restrictions are not expected to disappear in the foreseeable future.

Using a web proxy to shape incoming WLAN traffic or transcoding and scheduling media streams in a power-friendly manner enable substantial savings in the energy consumed by the WLAN interface of a client or the mobile client device (see Marcel C Rosu et al., "PAWP: A Power Aware Proxy for Wireless LAN Clients", WMCSA 2004, English Lake District, December 2-3 2004; and S. Mohapatra et al., "Integrated Power Management for Video Streaming to Mobile Handheld Devices," In Proceedings of ACM Multimedia 2003.) These approaches are focused to one client running one application (web browser or media player) and there is no clear extension of these approaches to multiple applications and mobile clients.

In contrast, relatively little work has been done on supporting a collection of mobile devices as a group and optimize their usage of shared resources according to group policies. More specifically, there are no known techniques for power-aware scheduling of the shared WLAN bandwidth between the mobile clients, despite the fact that a significant fraction of the energy consumed by mobile clients is directly or indirectly communication-related. Unfortunately, efficiently scheduling WLAN traffic to enable significant energy savings requires more information about the client configuration, current state, application, and application payload than currently available.

Using transport- or network-level attributes, such as client IP address or TCP/UDP port number, to differentiate between users or applications, is difficult since the majority of the WLAN traffic consists of TCP packets carrying HTTP payloads, i.e. using TCP port 80. An increasing number of networked applications besides web browsers, such as multimedia streaming or email clients, use HTTP as this simplifies firewall configuration considerably; this trend is expected to continue. In addition, dynamic IP address allocation is the preferred method for managing the addresses of mobile WLAN clients, which makes even more difficult to use network/transport level attributes to differentiate between different applications/users on the WLAN. Therefore, there is a need to use application-level information to identify users and applications, which is, or could be made available to the network proxies assisting client applications. Unfortunately, not enough information on the current state of the mobile client, such as battery level, is made available at the application level. Therefore there is a need to enhance existing client protocols and applications to provide additional client information.

Provided that enough information on the configuration and current state of the mobile devices is collected, a need has been recognized in connection with providing a mechanism that controls the usage of shared resources, such as WLAN bandwidth, in a way that promotes energy savings in all the client devices under control. Without such a mechanism, existing techniques which were developed for one client device running one application, will conflict with each other and fail to enable the expected energy savings. Therefore, a need has been recognized in connection with optimizing energy usage among the mobile devices in a group according to predetermined group policies.

SUMMARY OF THE INVENTION

There is broadly contemplated, in accordance with at least one presently preferred embodiment of the present invention, an extension which proposes to extend the functionality provided by network proxies, in particular HTTP proxies, such as web caches and web/media transcoders, with capabilities that collect information on the client configuration, such as component types and power-related parameters, and current energy-related state, such as battery and display brightness levels. Particularly, it is proposed herein that the functionality of network proxies be further extended to optimize the use of shared resources, such as WLAN bandwidth, among a group of mobile clients in a way that optimizes energy usage among the clients according to predefined group policies. As more network applications use HTTP as transport, a larger fraction of the WLAN traffic is handled by the HTTP proxy.

To collect all the necessary information, application-level protocols, such as HTTP, have to be extended with energy-related elements. In addition, to efficiently schedule traffic, HTTP proxies inspect the HTTP payload and use domain- or application-specific techniques to schedule traffic in a way that improves energy usage without impacting user-experience. As most WLAN traffic is directed towards the mobile clients (web page downloads, media streams played), proxies have significant opportunities to influence WLAN bandwidth usage.

In summary, one aspect of the invention provides an apparatus for facilitating wireless communication traffic for at least one client which communicates with an access point and which transitions between a power save mode and an active mode, the apparatus comprising: an arrangement for probing a client to determine its status with respect to communication with the access point; the probing arrangement being adapted to perform at least one of the following (a), (b) and (c): (a) ascertain the time of receipt of an initial beacon at a client; (b) ascertain at least one interval between which successive beacons are received by the client; and (c) ascertain a client time out interval for staying in active mode.

Another aspect of the invention provides a method of facilitating wireless communication traffic for at least one client which communicates with an access point and which transitions between a power save mode and an active mode, the method comprising the steps of: probing a client to determine its status with respect to communication with the access point; the probing step comprising performing at least one of the following (a), (b) and (c): (a) ascertaining the time of receipt of an initial beacon at a client; (b) ascertaining at least one interval between which successive beacons are received by the client; and (c) ascertaining a client time out interval for staying in active mode.

Furthermore, an additional aspect of the invention provides a program storage device readable by machine, tangibly embodying a program of instructions executable by the machine to perform method steps for facilitating wireless communication traffic for at least one client which communicates with an access point and which transitions between a power save mode and an active mode, the method comprising the steps of: probing a client to determine its status with respect to communication with the access point; the probing step comprising performing at least one of the following (a), (b) and (c): (a) ascertaining the time of receipt of an initial beacon at a client; (b) ascertaining at least one interval between which successive beacons are received by the client; and (c) ascertaining a client time out interval for staying in active mode.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
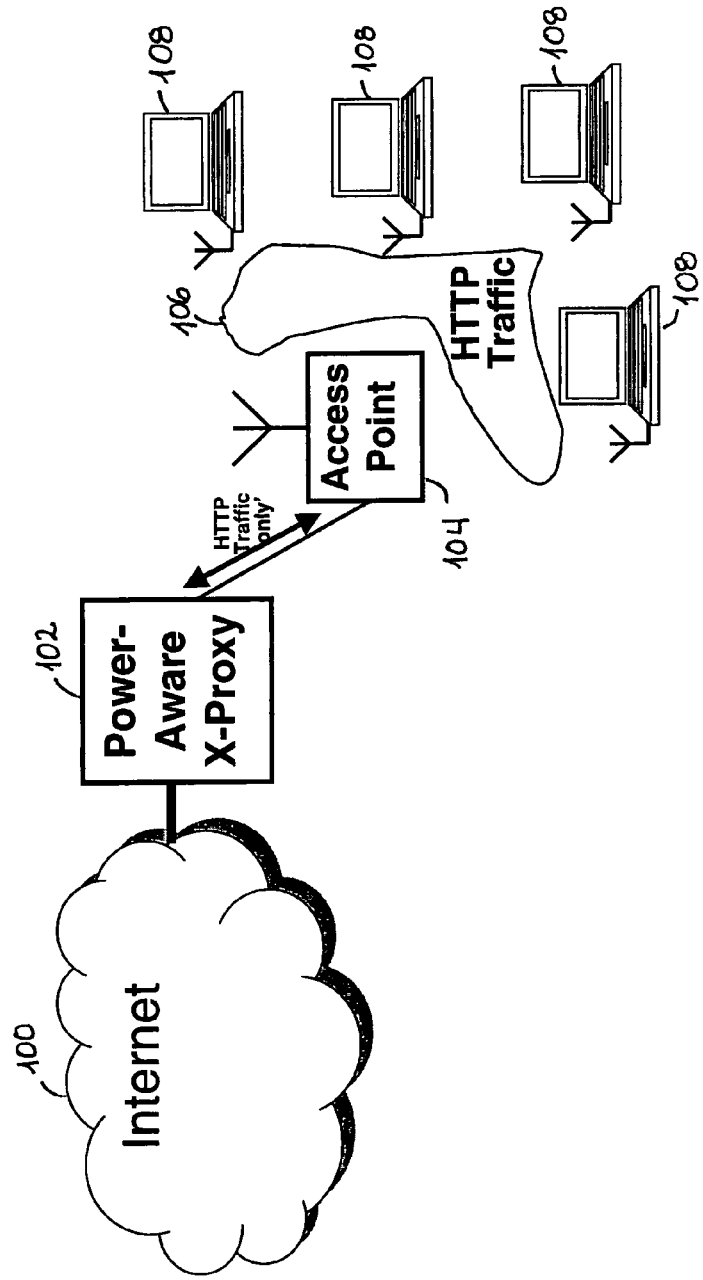
FIG. 1 illustrates a wireless LAN architecture using Power-Aware Proxies to support client applications and schedule incoming Internet traffic.
Figure 2:
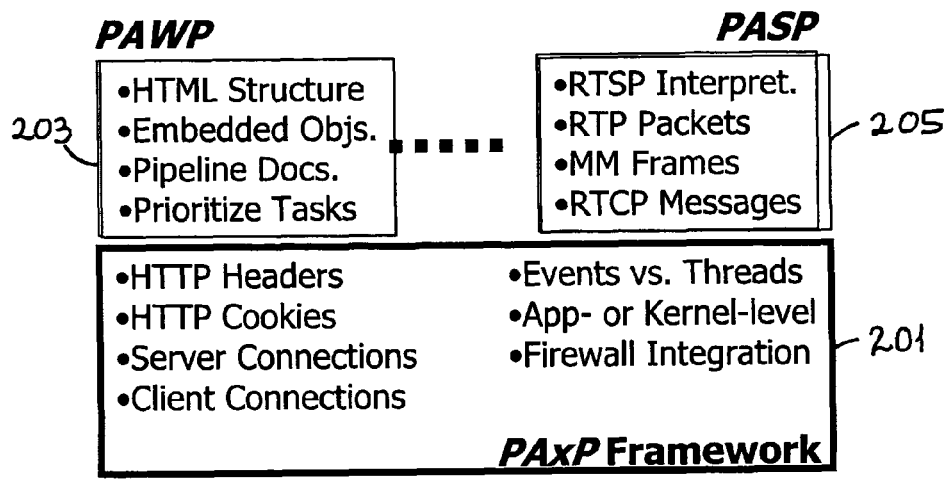
FIG. 2 illustrates the architecture of a Power-Aware HTTP-based Proxy.

FIG. 1 illustrates a wireless LAN architecture using an existing Power-Aware Proxy to support client applications and schedule incoming Internet traffic, while FIG. 2 illustrates existing architecture of a Power-Aware HTTP-based Proxy.

As shown in FIG. 1, a conventional PAxP proxy 102, which accepts or provides content from or to the internet 100, is typically in communication (via HTTP traffic only) with one or more access points 104, which themselves are in communication, via further HTTP traffic 106, with various clients 108.

Referring to FIG. 2, HTTP proxies are normally implemented as extensions to a Proxy-Aware x-Proxy (PAxP) framework 201, which implements the core HTTP processing tasks. The framework extensions use techniques specific to the HTTP payload, such as web documents or multimedia streams, to control the traffic shaper and to compensate for any negative impact that traffic shaping may have.

Such an approach assumes that the cost of bandwidth across the wide area network (WAN) is low and therefore it is cost effective to trade increased WAN usage for improved energy efficiency of the mobile device. In addition, it is assumed that the proxy has access to several configuration parameters of the mobile device and WLAN access point.

By way of an illustrative and non-restrictive example, an application addressed herein is use of the popular 802.11 WLAN technology. The 802.11 specifications (see Part 11, "Wireless LAN Medium Access Control [MAC] and Physical layer [PHY]

Specifications", ANSI/IEEE Std 802.11, 1999) define two power management modes: active mode and power save mode. In power save mode, which is the 802.11 term for sleep mode, the WLAN interface consumes 5 to 50 times less power than in active mode. A typical WLAN driver switches the interface to power save mode after an idle interval of approximately 100 msecs. In such configurations, the relative power consumed by the WLAN interface varies from 5-10% in high-end laptops to more than 50% in PDAs. The traffic shaping performed by the extensions to the PAxP framework transform the incoming traffic of each client (separately) into a sequence of packet bursts separated by long idle intervals.

The "bursty" character of the shaped traffic allows the WLAN interface to safely switch to power save mode after a shorter idle time interval, i.e., use a smaller timeout value, which reduces its energy consumption. Without using proxies, due to the hard-to-predict nature of incoming traffic, it is not possible to save energy by reducing the interface timeout without shaping the incoming traffic. This simplistic approach increases the roundtrip times of TCP connections, which degrades the performance of client applications.

Presented hereinbelow, in contrast, is the architecture of a "Power-Aware Streaming Proxy" (PASP) 205 in accordance with at least one presently preferred embodiment of the present invention. This architecture is designed to improve the energy efficiency of playing multimedia streams on mobile devices. PASP uses RTSP/RTP semantics to effectively schedule media streams across the WLAN. Besides shaping incoming traffic, PASP performs domain-specific stream manipulations, such as dropping select video frames and packets while preserving the consistency of the forwarded stream. The PASP proxy is similar to the Power-Aware Web Proxy (PAWP) 203, which performs domain specific operations on downloaded web pages to improve the energy efficiency of web browsing on mobile devices. Both proxies are preferably implemented as extensions of the PAxP framework 201.

Figure 3:
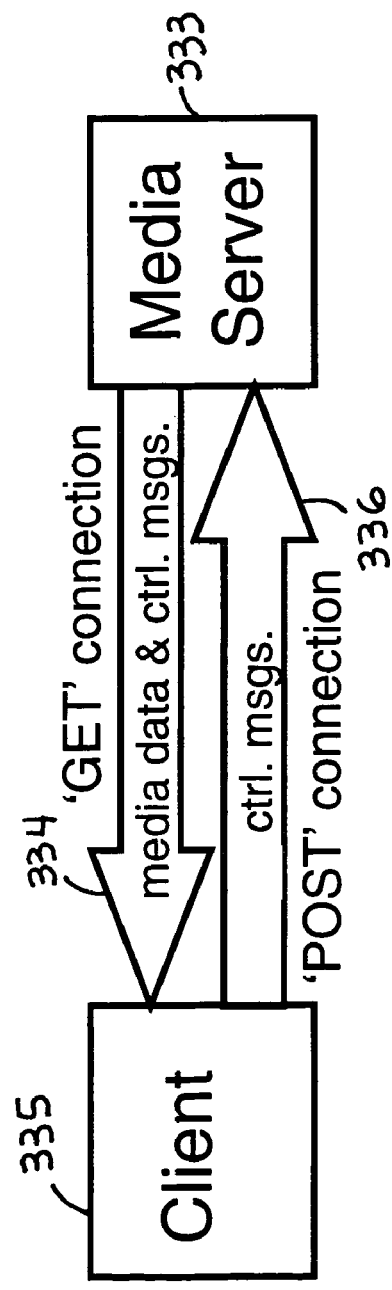
FIG. 3 illustrates how RTSP/RTP media streams are tunneled over HTTP connections.

As shown in FIG. 3, illustrating a media server 333 and a client 335, one connection (334), indicated as "GET", is used to transport the server-to-client data, which includes media stream data and server control messages. The client 335 opens the first connection 334 using an HTTP GET request. The initial reply from the server 333 contains only the HTTP header, which includes the 'Connection:close' field; therefore, this connection stays open until closed by the server 333.

The second connection (336), indicated as "POST", is used to transport the client-to-server data, which includes control messages only. The client 335 opens the second connection 336 using an HTTP POST request. The server 333 never replies to this request.

By way of additional background, the disclosure now turns to a brief overview of the power management features of an 802.11 client interface, or station, in an infrastructure network.

The power management mode of a station can be either active or power save. The power state of a station can be either Awake, when the station is fully powered, or Doze, when the station consumes very little power but it is not able to receive or transmit frames. In active mode, the station is in the Awake state. In power save mode, the station is typically in Doze state but it transitions to Awake state to listen for select beacons, which are broadcasted every 102.4 ms by the wireless access point. The station selects how often it wakes up to listen to beacons when it associates with the access point. The transition between modes is always initiated by the station and requires a successful frame exchange with the access point.

The access point buffers all pending traffic for the stations known to be in power save mode and alerts these stations in the appropriate beacons. When a station detects that frames are pending in the access point, it sends a poll message to the access point. The station remains in the Awake state until it receives the response to its poll.

The access point's response to the poll is either the next pending frame or an acknowledgement (ACK) frame which signals that the access point delays the transmission of the pending frame and assumes the responsibility for initiating its delivery. The station must acknowledge (send an ACK frame for) every received frame. If the More Data field of the frame indicates additional pending frames, the station may send another poll frame. Otherwise, the station returns to Doze power state.

The power mode of the client station is controlled by the WLAN device driver. The station may switch from power save mode to active mode at any point in time, e.g., after receiving the first data frame from the access point, or after sending a data frame to the access point. The station will switch back to power save mode after no data frames are received or transmitted for a predetermined interval. Switching from active mode to power save mode delays receiving any frames until after the next beacon is received.

Switching a client from power save mode to active mode to receive frames is very advantageous from a performance standpoint, because in the active mode the access point will forward data frames to the client as soon as they come in, while in the power save mode it must queue them up and wait for the client to wake up. Unfortunately, in order to absorb variations in packet delivery, the client must remain in active mode while waiting for more data, which wastes power. Thus, from an energy standpoint, it is never advantageous to transition into the active mode except if it is known, or highly expected, that data will be coming in at a very high rate.

Figure 4A:
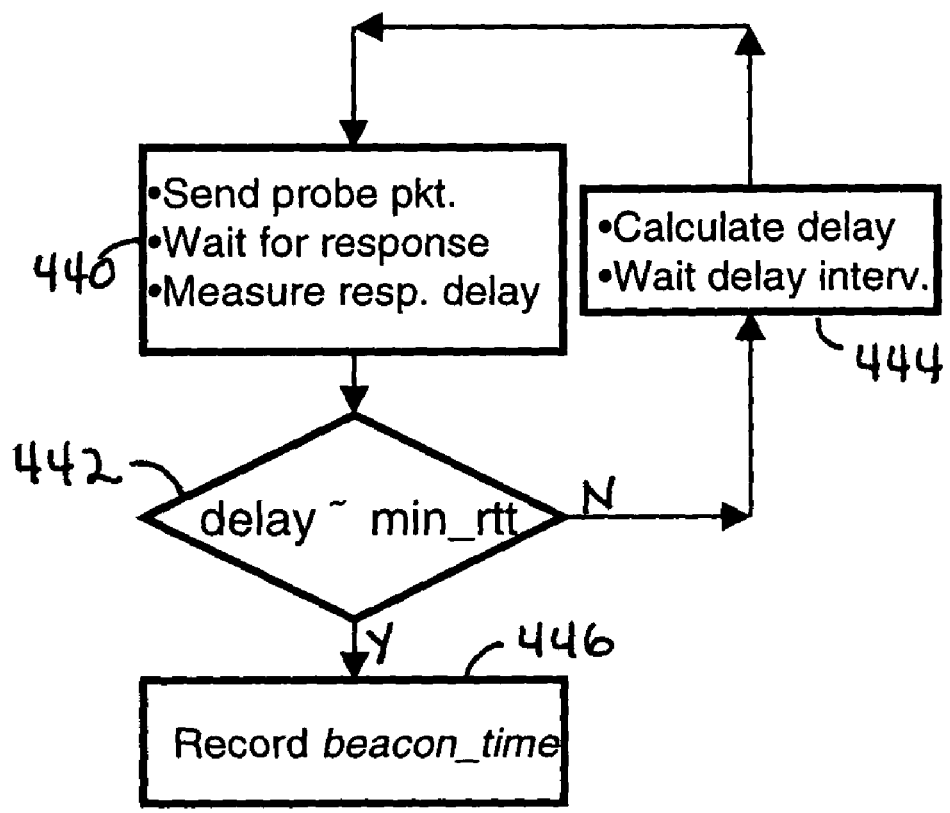
FIGS. 4A, 4B and 4C illustrate procedures for probing an 802.11-enabled mobile device to determine the configuration parameters of its WLAN interface and synchronize with its interface operation.
Figure 4B:
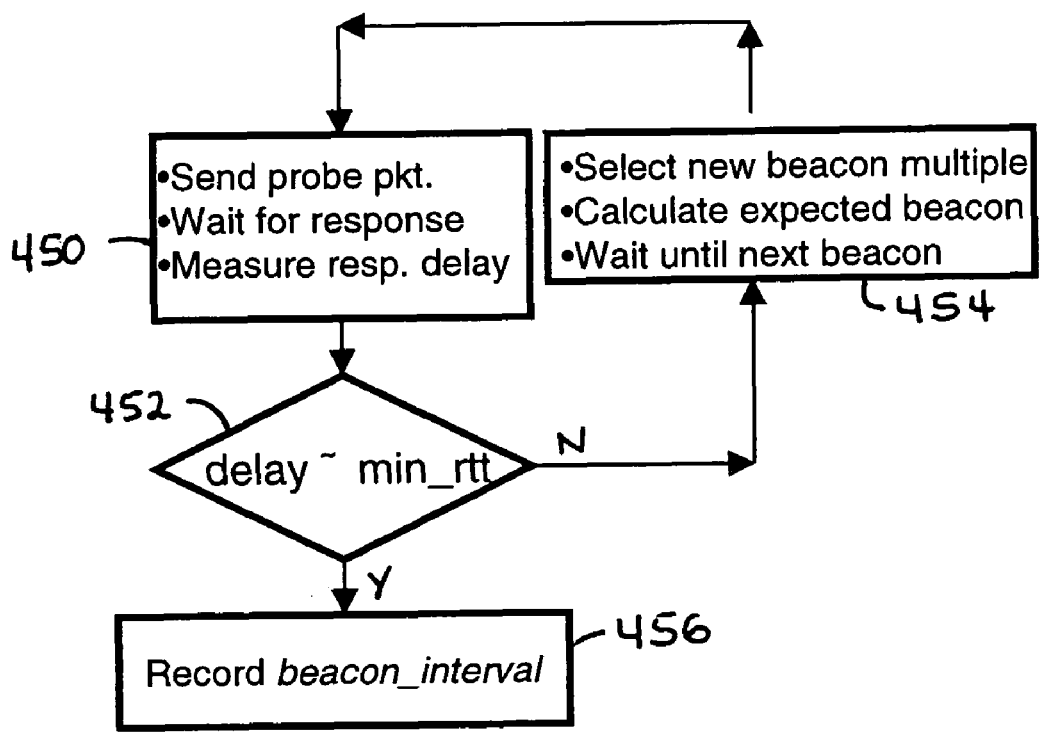
Figure 4C:
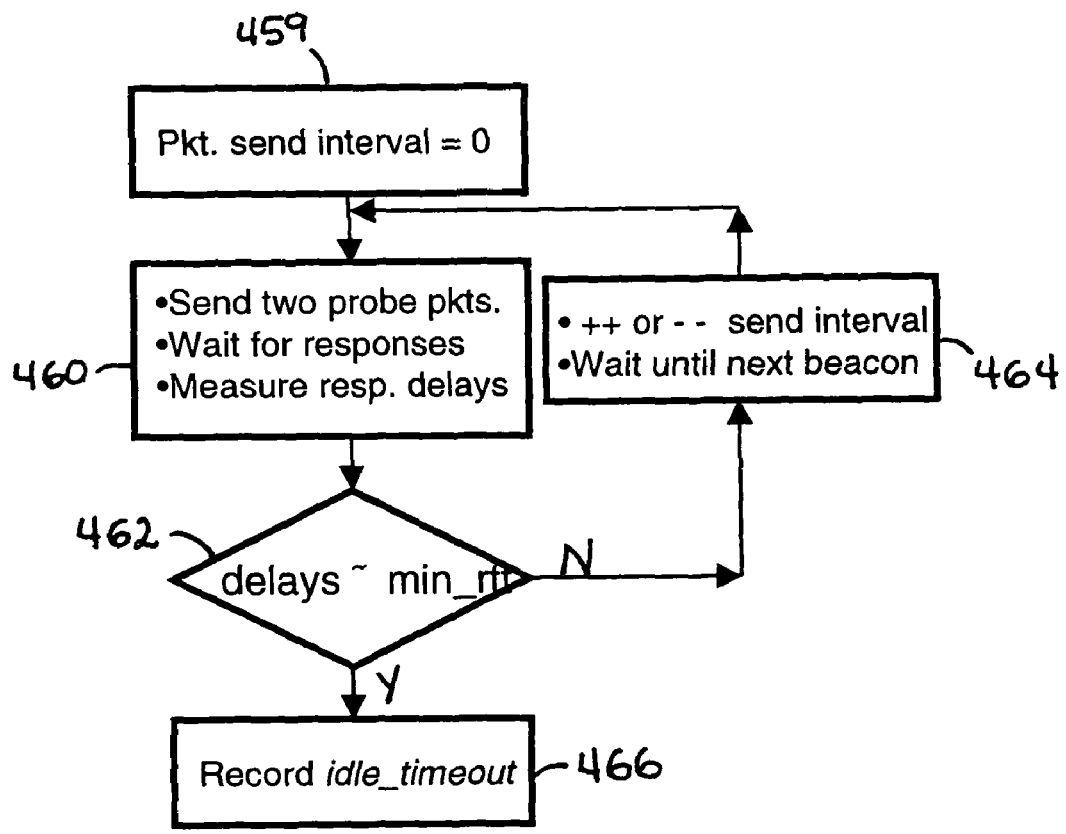

With all the foregoing in mind, there are broadly contemplated, in accordance with at least one presently preferred embodiment of the present invention, protocols such as those illustrated in FIGS. 4A, 4B and 4C. Particularly, FIGS. 4A, 4B and 4C illustrate procedures for probing an 802.11-enabled mobile device to synchronize with its interface operation and, to determine the configuration parameters of its WLAN interface, and particularly to determine time intervals for interacting with beacons or staying in a power-save mode as discussed above.

FIGS. 4A, 4B, and 4C illustrate the process of determining the beacon times for a base station, the beacon interval or multiplicity of a given WLAN client and the client's timeout interval. In the following, it is assumed that the WLAN client is configured to take advantage of the Power Save mode. Therefore, packets sent to the client sometimes get buffered in the base station until the next beacon that the client is configured to listen to. Furthermore, it is assumed that the client always responds to these probe packets immediately. Response packets are never delayed by the base station. Packets sent to the client when the client is in active mode or immediately before the beacon, when the client is in power save mode, trigger an immediate response. In the following, the time taken by such a fast response is called min_rtt (which may be termed, "minimum round trip time"). Its value can be determined by the proxy using a train of packets to the client, some of which are guaranteed to be forwarded immediately by the base station, either because the client is in active mode or because they happen to be sent immediately before a beacon is sent. Due to very small MAC-level delays, the measured min_rtt values are actually a randomly distributed collection of values, with a lower bound determined by the size of the probe packets, the WLAN technology and base station used. In summary, any measured rtt (round trip time) that is very close, within one or two msecs from this bound is considered to be a min_rtt.

FIG. 4A illustrates a process for probing to determine a "beacon time" parameter. Note that this parameter characterizes the WLAN base station and therefore, needs to be determined only for the first client using the base station. As shown, a probe packet is sent to a device, a response is awaited and the response delay is measured (440). If the measured response delay is not approximately equal to the predetermined parameter min_rtt (442), then the delay is calculated and a delay interval is traversed (444) before sending out another probe packet (440). If the response delay is indeed approximately equal to min_rtt, then the resultant parameter beacon_time is recorded.

FIG. 4B illustrates a process for probing to determine a "beacon interval" parameter. As shown, a probe packet is sent to a device, a response is awaited and the response delay is measured (450). If the measured response delay is not approximately equal to min_rtt (452), then a new beacon multiple is selected, the expected beacon is calculated, and the next beacon is awaited (454) before sending out another probe packet (450). If the response delay is indeed approximately equal to min_rtt, then the resultant parameter beacon_interval is recorded (456).

FIG. 4C illustrates a process for probing to determine an "idle timeout" parameter. In this case, as shown, a packet send interval is first set to zero (459) and then two probe packets are sent out, responses thereto are awaited and the response delays are measured (460). If the measured response delays are not approximately equal to min_rtt (462), then the packet send interval is increased or decreased and the next beacon is awaited (464) before sending two more probe packets (460). If the response delay is indeed approximately equal to min_rtt, then the resultant parameter idle_timeout is recorded (456).

Figure 5:
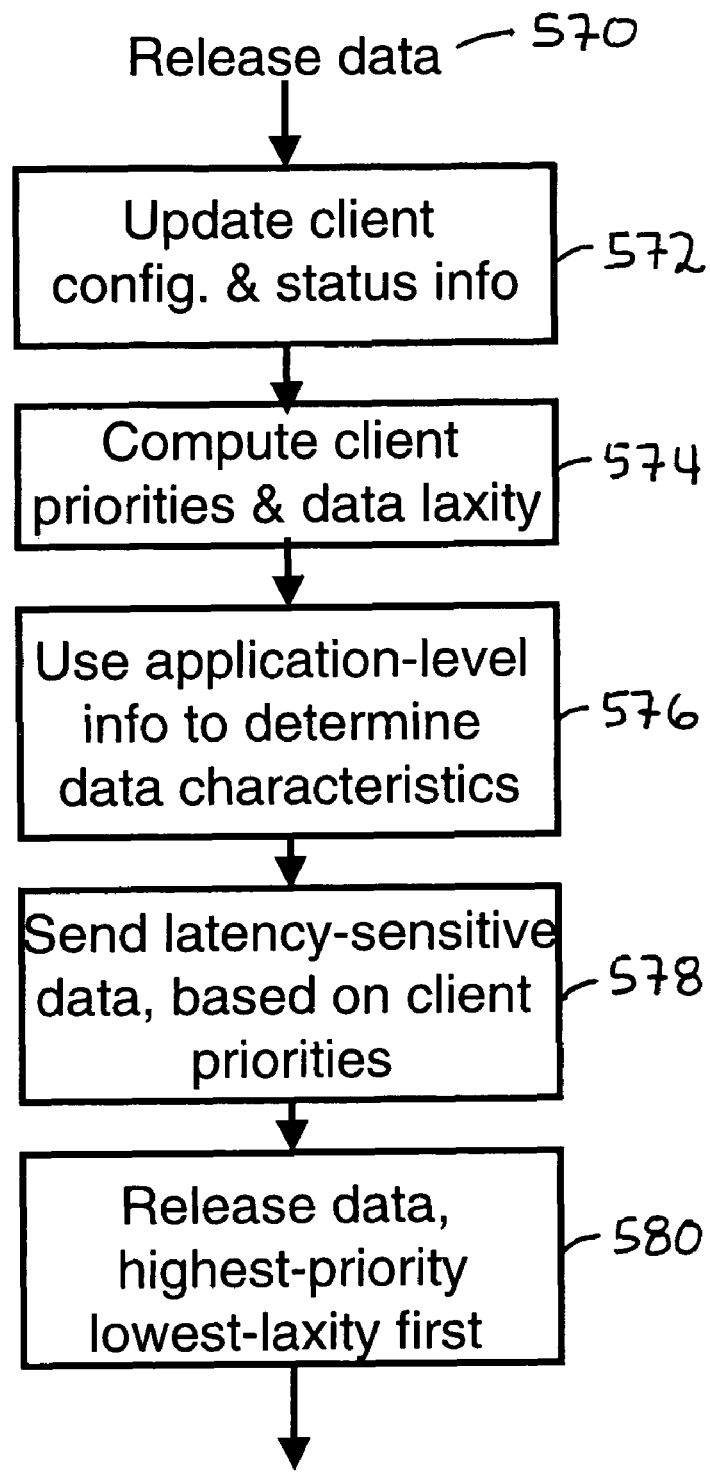
FIG. 5 illustrates a process for releasing data to the WLAN clients by the HTTP-based proxy.

FIG. 5 illustrates a process for releasing data to the WLAN clients by the HTTP-based proxy. This is the process used to decide which of the data received by the proxy is forwarded to which client. Note that in certain situations, in contrast to previous work, only a fraction of the data received for a client, such as the highest-priority data or the lowest-laxity data, is forwarded. Such a decision is necessary due to the fact that all clients share the same transmission medium. As shown, subsequent to a release of data (570), client configuration and status information is updated (572). Thence, client priorities and data laxity are computed (574) and application-level information is used to determine data characteristics (576). Thereafter, latency-sensitive data is sent, based on client priorities (578) and data is then finally released, with the highest-priority and lowest-laxity data being released first (580).

In contrast to previous work, the present invention takes into account the expected power mode and power state of the WLAN client interface when scheduling packets. These parameters are combined with the other, previously considered client parameters, such as client priority or class of service, application or traffic type (data vs. control packets), to schedule incoming WLAN traffic. Similar to previous work in packet scheduling for wired networks, multiple clients or endpoints share an outgoing link. Dissimilar to packet scheduling for wired networks, both outgoing and incoming links share the same medium in wireless LANs.

In addition to power modes and states of the WLAN interface, the present invention takes into account other power-related characteristics of the WLAN client such as power consumption and its relationship with the incoming traffic characteristics, such as rate and burstiness, or battery level and its idle consumption rate.

By controlling the incoming traffic, the present invention indirectly controls outgoing traffic as well, for a wide range of network traffic such as TCP/IP traffic. Since both incoming and outgoing traffic characteristics impact client energy consumption, the traffic scheduling proposed by the invention takes this indirect relationship into account as well.

In addition to traditional workconserving scheduling algorithms, the invention proposes using non-workconserving packet/data scheduling algorithms, which sometimes send no packets to any of the WLAN clients, even when the wireless medium is free. The motivation for using these type of algorithms is twofold. First, for power-related reasons, sending larger bursts of packets to clients is preferred. Second, leaving the wireless medium free for short intervals allows clients to use the medium more efficiently, say by sending data in larger bursts, as incoming and outgoing traffic share the same frequency band.

It is to be understood that the present invention, in accordance with at least one presently preferred embodiment, includes an arrangement for probing a client to determine its status with respect to communication with the access point, which may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising:
one or more processors; and
a memory operatively connected to the one or more processors, the memory comprising proxy server code that when executed facilitates delivery of wireless communication traffic for one or more clients, wherein the one or more clients transition between a power save mode and an active mode, said proxy server further comprising:
a probing arrangement that probes the one or more clients to determine a power status of the one or more clients with respect to communication with an access point wherein said probing arrangement is adapted to ascertain a client time interval for staying in active mode; and a providing arrangement that shapes the wireless communication traffic to said one or more clients via the access point, wherein shaping wireless communication traffic comprises transmitting the wireless communication traffic as a sequence of packet bursts synchronized to the active mode of the one or more clients;

wherein the client time interval for staying in active mode is ascertained via:
transmitting one or more probe packets to a client;
measuring a response delay of the client subsequent to transmission of at least one of the one or more probe packet; and
adjusting a packet send interval and awaiting a new beacon responsive to response delays not being substantially equivalent to a predetermined minimum round trip time.

2. The apparatus according to claim 1, wherein the wireless communication traffic comprises internet traffic.

3. The apparatus according to claim 1, wherein the access point comprises an 802.11 client interface.

4. The apparatus according to claim 1, wherein said probing arrangement is adapted to ascertain the time of receipt of an initial beacon solely at one client, prior to receipt of one or more further beacons at one or more further clients.

5. The apparatus according to claim 1, wherein said probing arrangement is adapted to ascertain a time of receipt of an initial beacon via:
transmitting a probe packet to a client;
measuring a response delay of the client subsequent to transmission of a probe packet; and
continuing to measure response delays of the client subsequent to transmission of additional probe packets, until the response delay is substantially equivalent to a predetermined minimum round trip time.

6. The apparatus according to claim 1, wherein said probing arrangement is adapted to ascertain at least one interval between which successive beacons are received by the one or more clients via:
transmitting a probe packet to a client;
measuring a response delay of the client subsequent to transmission of a probe packet;
calculating a new beacon multiple and awaiting a new beacon if the response delay is not substantially equivalent to a predetermined minimum round trip time; and
continuing to measure response delays of the client subsequent to transmission of additional probe packets, until the response delay is substantially equivalent to a predetermined minimum round trip time.

7. The apparatus according to claim 1, wherein ascertaining the client time interval further comprises:
continuing to measure response delays of the client subsequent to transmission of additional probe packets, until the response delay is substantially equivalent to a predetermined minimum round trip time; and
recording the client idle time interval responsive to response delays being substantially equivalent to the predetermined minimum round trip time.

8. An apparatus comprising:
one or more processors;
a memory operatively coupled to the one or more processors; and
a facilitating arrangement operatively connected to the memory, the facilitating arrangement facilitating wireless communication for at least one client, wherein the at least one client communicates with an access point and transitions between a power save mode and an active mode, said facilitating arrangement further comprising:

a probing arrangement that probes the at least one client to determine a power status of the at least one client with respect to communication with the access point wherein said probing arrangement is adapted to ascertain a client time interval for staying in active mode; and an arrangement that releases data to an access point from a proxy server, said releasing arrangement being adapted to release data based upon one or more of the following (a) and (b):
(a) anticipated power related characteristics of the at least one client; and
(b) previously determined client parameters;

wherein the client time interval for staying in active mode is ascertained via:
transmitting one or more probe packets to a client;
measuring a response delay of the client subsequent to transmission of at least one of the one or more probe packet; and
adjusting a packet send interval and awaiting a new beacon responsive to response delays not being substantially equivalent to a predetermined minimum round trip time.

9. The apparatus according to claim 8, wherein said releasing arrangement releases data based upon all of (a) and (b).

10. The apparatus according to claim 8, wherein the wireless communication traffic comprises internet traffic.

11. The apparatus according to claim 8, wherein the access point comprises an 802.11 client interface.

12. The apparatus according to claim 8, wherein the power related characteristics comprises at least one of the following: power mode, power state, power consumption, relationship between power consumption and incoming traffic characteristics, battery level, and battery consumption.

13. The apparatus according to claim 12, wherein the incoming traffic characteristics comprises at least one of the following: rate and burstiness.

14. A method comprising:
facilitating wireless communication traffic for at least one client, wherein the client communicates with an access point and transitions between a power save mode and an active mode, said facilitating further comprising:
probing the at least one client to determine its status with respect to communication with the access point, said probing step comprising performing the following steps (a), (b) and (c):
(a) ascertaining the time of receipt of an initial beacon at the at least one client;
(b) ascertaining at least one interval between which successive beacons are received by the at least one client; and
(c) ascertaining a client time out interval for staying in active mode via:
transmitting one or more probe packets to a client;
measuring a response delay of the client subsequent to transmission of at least one of the one or more probe packets;
adjusting a packet send interval and awaiting a new beacon responsive to response delays not being substantially equivalent to a predetermined minimum round trip time.

15. The method according to claim 14, wherein the wireless communication traffic comprises internet traffic.

16. The method according to claim 14, wherein the access point comprises an 802.11 client interface.

17. The method according to claim 14, wherein said probing step comprises ascertaining the time of receipt of an initial beacon solely at one client, prior to receipt of one or more further beacons at one or more further clients.

18. The method according to claim 14, wherein said probing step comprises ascertaining the time of receipt of an initial beacon via:
    transmitting a probe packet to a client;
    measuring a response delay of the client subsequent to transmission of a probe packet; and
    continuing to measure response delays of the client subsequent to transmission of additional probe packets, until the response delay is substantially equivalent to a predetermined minimum round trip time.

19. The method according to claim 14, wherein said probing step comprises ascertaining at least one interval between which successive beacons are received by the client via:
    transmitting a probe packet to a client;
    measuring a response delay of the client subsequent to transmission of a probe packet;
    calculating a new beacon multiple and awaiting a new beacon if the response delay is not substantially equivalent to a predetermined minimum round trip time; and
    continuing to measure response delays of the client subsequent to transmission of additional probe packets, until the response delay is substantially equivalent to a predetermined minimum round trip time.

20. The method according to claim 14, wherein ascertaining a client time interval for staying in active mode further comprises:
    continuing to measure response delays of the client subsequent to transmission of additional probe packets, until the response delay is substantially equivalent to a predetermined minimum round trip time; and
    recording the client idle time interval responsive to response delays being substantially equivalent to the predetermined minimum round trip time.

21. The method according to claim 14, further comprising a step of scheduling wireless communication traffic from a proxy server to the at least one client based on parameters determined via at least one of (a), (b) and (c).

22. The method according to claim 21, wherein said step of scheduling wireless communication traffic from a proxy server to the at least one client comprises scheduling traffic based on parameters determined via all of (a), (b) and (c).

23. A program storage device readable by machine, tangibly embodying a program of instructions executable by the machine to perform steps comprising:
    facilitating wireless communication traffic for at least one client, wherein the client communicates with an access point and transitions between a power save mode and an active mode, said facilitating further comprising:
    probing the at least one client to determine its status with respect to communication with the access point, said probing step comprising performing the following steps (a), (b) and (c):
        (a) ascertaining the time of receipt of an initial beacon at the at least one client;
        (b) ascertaining at least one interval between which successive beacons are received by the at least one client; and
        (c) ascertaining a client time out interval for staying in active mode via:
            transmitting one or more probe packets to a client;
            measuring a response delay of the client subsequent to transmission of at least one of the one or more probe packets; and
            adjusting a packet send interval and awaiting a new beacon responsive to response delays not being substantially equivalent to a predetermined minimum round trip time.

24. A method comprising:
    facilitating wireless communication traffic for at least one client, wherein the client communicates with an access point and transitions between a power save mode and an active mode, said facilitating further comprising:
    releasing data to an access point from a proxy server, said releasing step comprising releasing data based on the following steps (a) and (b):
        (a) anticipated power related characteristics of the at least one client; and
        (b) previously determined client parameters; and
    probing the at least one client to determine its status with respect to communication with the access point, said probing step comprising performing the following steps (c), (d) and (e):
        (c) ascertaining the time of receipt of an initial beacon at the at least one client;
        (d) ascertaining at least one interval between which successive beacons are received by the at least one client; and
        (e) ascertaining a client time out interval for staying in active mode via:
            transmitting one or more probe packets to a client;
            measuring a response delay of the client subsequent to transmission of at least one of the one or more probe packets; and
            adjusting a packet send interval and awaiting a new beacon responsive to response delays not being substantially equivalent to a predetermined minimum round trip time.

25. The method according to claim 24, wherein the wireless communication traffic comprises internet traffic.

26. The method according to claim 24, wherein the access point comprises an 802.11 client interface.

27. The method according to claim 24, wherein the power related characteristics comprises at least one of the following: power mode, power state, power consumption, relationship between power consumption and incoming traffic characteristics, battery level, and battery consumption.

28. The method according to claim 27, wherein the incoming traffic characteristics comprises at least one of the following: rate and burstiness.

29. A program storage device readable by machine, tangibly embodying a program of instructions executable by the machine to perform method steps comprising:
    facilitating wireless communication traffic for at least one client, wherein the client communicates with an access point and transitions between a power save mode and an active mode, said facilitating further comprising:
    releasing data to an access point from a proxy server, said releasing step comprising releasing data based on the following steps (a) and (b):
        (a) anticipated power related characteristics of the at least one client; and
        (b) previously determined client parameters; and
    probing the at least one client to determine its status with respect to communication with the access point, said probing step comprising performing the following steps (c), (d) and (e):
        (c) ascertaining the time of receipt of an initial beacon at the at least one client;
        (d) ascertaining at least one interval between which successive beacons are received by the at least one client; and (e) ascertaining a client time out interval for staying in active mode via:
  transmitting one or more probe packets to a client;
  measuring a response delay of the client subsequent to transmission of at least one of the one or more probe packets; and adjusting a packet send interval and awaiting a new beacon responsive to response delays not being substantially equivalent to a predetermined minimum round trip time.

* * * * *